United States Patent
Omi

(10) Patent No.: US 7,750,609 B2
(45) Date of Patent: Jul. 6, 2010

(54) OUTPUT DEVICE AND ELECTRONIC DEVICE PROVIDED WITH SAME

(75) Inventor: Masaki Omi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 268 days.

(21) Appl. No.: 11/910,315

(22) PCT Filed: Apr. 20, 2006

(86) PCT No.: PCT/JP2006/308349

§ 371 (c)(1),
(2), (4) Date: Oct. 1, 2007

(87) PCT Pub. No.: WO2006/115178

PCT Pub. Date: Nov. 2, 2006

(65) Prior Publication Data

US 2009/0251118 A1    Oct. 8, 2009

(30) Foreign Application Priority Data

Apr. 21, 2005   (JP) .............................. 2005-123435

(51) Int. Cl.
  G05F 1/40    (2006.01)
  G05F 1/10    (2006.01)
(52) U.S. Cl. ...................................... 323/271; 323/222
(58) Field of Classification Search ......... 323/222–225, 323/268, 271, 282, 285, 349–351; 363/147
  See application file for complete search history.

(56) References Cited

U.S. PATENT DOCUMENTS

| 5,789,779 | A | 8/1998 | Arai et al. | |
|---|---|---|---|---|
| 6,326,959 | B1 | 12/2001 | Tanaka | |
| 6,958,595 | B2 | 10/2005 | Niiyama et al. | |
| 7,138,786 | B2 * | 11/2006 | Ishigaki et al. | ............. 323/224 |
| 7,560,910 | B2 * | 7/2009 | Hata et al. | ................. 323/222 |
| 2005/0007089 | A1 | 1/2005 | Niiyama et al. | |
| 2008/0203984 | A1 * | 8/2008 | Omi | .......................... 323/272 |

(Continued)

FOREIGN PATENT DOCUMENTS

JP    08-186261    7/1996

(Continued)

OTHER PUBLICATIONS

International Search Report of PCT/JP2006/308349, Jul. 11, 2006.*

*Primary Examiner*—Matthew V Nguyen
(74) *Attorney, Agent, or Firm*—Fish & Richardson P.C.

(57) ABSTRACT

A switching power supply IC (21) is provided with, in a form integrated into an integrated circuit: a terminal (T2) whereupon an input voltage (Vin) is applied through an inductor (Lex); a terminal (T3) from which an output voltage (Vout) for a loading LED is extracted; a transistor (N1) connected between the terminal (T2) and a grounding end; a transistor (P1) connected between the terminal (T2) and the terminal (T3); a transistor (P2) connected between the terminal (T3) and a backgate of the transistor (P1); and a switching control section (CTRL) for performing switching control to each transistor. During a step-up operation, the switching control section (CTRL) controls the switching of the transistors (N1, P1) complementarily to each other while continuously keeping the transistor (P2) on, and turns off all of the transistors (N1, P1, P2) when a step-up operation is stopped.

10 Claims, 6 Drawing Sheets

U.S. PATENT DOCUMENTS

2009/0091308 A1 * 4/2009 Omi .......................... 323/282

FOREIGN PATENT DOCUMENTS

| | | |
|---|---|---|
| JP | 10-319368 | 12/1998 |
| JP | 11-233730 | 8/1999 |
| JP | 2001-042961 | 2/2001 |
| JP | 2003-347913 | 12/2003 |
| JP | 2005-033862 | 2/2005 |

* cited by examiner

US 7,750,609 B2

OUTPUT DEVICE AND ELECTRONIC DEVICE PROVIDED WITH SAME

TECHNICAL FIELD

The present invention relates to a voltage step-up type switching power supply device (a chopper type power supply device) that steps up an input voltage to generate an output voltage.

BACKGROUND ART

As shown in FIG. 6A, in a conventional voltage step-up type switching power supply IC (Integrated Circuit) 100, the current let flow through an externally fitted inductor Lex is controlled by the switching of a power transistor PT integrated in the IC, and an output voltage Vout to be fed to a load Z is generated by rectifying-smoothing means composed of an externally fitted Schottky-barrier diode SBD and an externally fitted smoothing capacitor Cex.

As conventional arts related to the present invention, various disclosures and proposals have been made, as exemplified by: a semiconductor device capable of preventing parasitic-diode-associated faults that may invite various problems in the circuit built with the semiconductor device (see Patent Publication 1); a rectifier circuit capable of, even in cases where a MOSFET is used as a rectifier device, reducing the voltage fall across the MOSFET and thereby preventing degradation of rectification efficiency (see Patent Publication 2); and a power supply circuit capable of reducing the area occupied by the output-stage circuit thereof and thereby easily preventing a reverse current from flowing from a capacitor that is connected to an output terminal in parallel with a load (see Patent Publication 3).

Patent Publication 1: JP-A-H08-186261 (FIG. 3)
Patent Publication 2: JP-A-H11-233730
Patent Publication 3: JP-A-2003-347913

DISCLOSURE OF THE INVENTION

Problems to be Solved by the Invention

It is true that the above described conventional voltage step-up type switching power supply IC 100 is capable of stepping up an input voltage Vin to generate an output voltage Vout by on/off control (duty control) of the power transistor PT.

Inconveniently, however, in the conventional voltage step-up type switching power supply IC 100 shown in FIG. 6A, on the occasion that the operation of the device is stopped, even when the switching of the power transistor PT is stopped, the current path from the node to which the input voltage Vin is applied to the load Z is not necessarily cut off, and thus, for example, a variation in the input voltage Vin may cause a leak current to flow through the load Z. Disadvantageously, this results in an incomplete turning-off of power.

A solution to the above described disadvantage is to additionally provide, as shown in FIG. 6B, an externally fitted transistor Qex for cutting off the above mentioned current path. Doing so, however, involves the additional mounting of the transistor Qex, and thus makes it difficult to make the electronic device that incorporates the voltage step-up type switching power supply IC 100 compact, light, and slim as a whole.

Even with the externally fitted transistor Qex additionally provided as described above, if the node from which the output voltage Vout is fed to the load Z short-circuits to a low-potential node (ground short) as shown in FIG. 6C, a large current flows through the inductor Lex and the Schottky-barrier diode SBD and destroys these devices.

None of the conventional arts disclosed and proposed in the above mentioned Patent Publications 1 to 3 makes it possible to properly cut off the current path from the node to which the input voltage Vin is applied to the load Z, and thus none of them helps to solve the disadvantage described above.

An object of the present invention is to provide a voltage step-up type switching power supply device capable of properly cutting off the current path from a node to which an input voltage is applied to a load as necessary, and thereby to contribute to achieving miniaturization of and improved reliability in an electronic device incorporating such a voltage step-up type switching power supply device.

Means for Solving the Problem

To achieve the above object, according to one aspect of the present invention, a voltage step-up type switching power supply device is provided with, in a form integrated into an integrated circuit, an input terminal to which an input voltage is applied via an externally fitted inductor, an output terminal from which an output voltage is fed to a load, an output transistor connected between the input terminal and a predetermined standard voltage node, a first P-channel field-effect transistor connected between the input terminal and the output terminal, a second P-channel field-effect transistor connected between the output terminal and a backgate of the first P-channel field-effect transistor, and a switching control section that controls switching of the output transistor, the first P-channel field-effect transistor, and the second P-channel field-effect transistor. Here, the switching control section is configured such that, when the input voltage is stepped up to generate the output voltage, the switching control section controls switching of the output transistor and the first P-channel field-effect transistor complementarily to each other while keeping the second P-channel field-effect transistor on, and, when the operation of the device is stopped, the switching control section turns off all of the output transistor, the first P-channel field-effect transistor, and the second P-channel field-effect transistor (first configuration).

With this configuration, not only a current path via the first P-channel field-effect transistor but also a current path via a body diode accompanying the first P-channel field-effect transistor can be cut off by the second P-channel field-effect transistor. Therefore, unlike the conventional configuration where an externally fitted transistor is provided for cutting off a leak current, this configuration makes it possible to properly cut off a current path from the node to which the input voltage is applied to the load as necessary without preventing miniaturization and weight/thickness reduction of an electronic device incorporating the voltage step-up type switching power supply device.

According to the present invention, it is preferable that the voltage step-up type switching power supply device having the first configuration described above be further provided with, in a form integrated into the integrated circuit, a power supply terminal to which the input voltage is directly applied and a third P-channel field-effect transistor whose source is connected to the backgate of the first P-channel field-effect transistor and whose drain is connected to the power supply terminal, a gate of the third P-channel field-effect transistor being connected to the output terminal (second configuration). With this configuration, it is possible, when the output voltage falls to a predetermined potential level, to firmly fix backgate voltages of the first and second P-channel field-effect transistors to the input voltage and thereby to ensure that the first and second P-channel field-effect transistors remain in the off state.

According to the present invention, it is preferable that the voltage step-up type switching power supply device having the first configuration described above be configured such that, when the operation of the device is stopped, the switching control section applies the input voltage to gates of the first and second P-channel field-effect transistors (third configuration). With this configuration, the output voltage is allowed to fall abruptly. With this configuration, it is also possible to prevent a voltage which appears at the input terminal from abruptly rising at the same time that the operation of the device is stopped and thereby to eliminate the need to provide the device with an unnecessarily large withstand voltage margin.

According to the present invention, it is preferable that the voltage step-up type switching power supply device having the second configuration described above be configured such that, when the operation of the device is stopped, the switching control section applies the input voltage to gates of the first and second P-channel field-effect transistors (fourth configuration). With this configuration, while the first and second P-channel field-effect transistors are on, the third P-channel field-effect transistor can be kept off and backgates of the first and second P-channel field-effect transistors can be kept in a floating state, and thus it is possible to prevent a large current from flowing via the third P-channel field-effect transistor into internal circuits to which power is supplied via the power supply terminal and thereby to protect their components from breakdown.

According to the present invention, it is preferable that the voltage step-up type switching power supply device having either the first or second configuration described above be configured such that, when the operation of the device is stopped, the switching control section applies the output voltage to gates of the first and second P-channel field-effect transistors (fifth configuration). Thus, in cases where it is necessary to turn on/off the switching power supply IC 21 many times, adopting this configuration makes it possible to reduce power loss in and improve efficiency of the device.

According to the present invention, it is preferable that the voltage step-up type switching power supply device having any one of the first to fifth configurations described above be further provided with, in a form integrated into the integrated circuit, an error amplifier that generates an error voltage signal by amplifying a difference between a predetermined target voltage and a feedback voltage that varies with the output voltage, an oscillator that generates a predetermined triangular-wave voltage signal, and a PWM comparator that compares the error voltage signal with the triangular-wave voltage signal and generates a PWM signal. Here, when the input voltage is stepped up to generate the output voltage, the switching control section, based on the PWM signal, controls the switching of the output transistor and the first transistor complementarily to each other (sixth configuration). With this configuration, it is possible to keep the output voltage equal to its target value.

According to the present invention, it is preferable that the voltage step-up type switching power supply device having any one of the first to sixth configurations described above be further provided with an output-short detecting circuit that monitors the output voltage and generates an output-short detection signal for indicating to the switching control section whether or not an output shout circuit is occurring. Here, the switching control section, when it recognizes that an output short is occurring based on the output-short detection signal, turns off all of the output transistor, the first P-channel field-effect transistor, and the second P-channel field-effect transistor (seventh configuration). With this configuration, it is possible to prevent a short-circuit current from flowing from the inductor into the switching power supply device and thereby to protect devices inside the device and components externally fitted to the device from breakdown.

According to the present invention, it is preferable that, in the voltage step-up type switching power supply device having the seventh configuration described above, the output-short detecting circuit be provided with a comparator that inverts an output logic thereof when the output voltage falls below a predetermined threshold voltage, and output-detection masking means that, during a predetermined output-detection masking period starting at a startup of the device, produces a constant output regardless of the output logic of the comparator, and after the predetermined output detection masking period ends, reflects the output logic of the comparator by inverting the output logic of the output-short detection signal. Here, the switching control section, on recognizing that an output short is occurring based on the output-short detection signal, turns off all of the output transistor, the first P-channel field-effect transistor, and the second P-channel field-effect transistor (eighth configuration). With this configuration, it is possible to prevent failure to start up which may be caused by the comparator being incapable of output detection.

According to another aspect of the present invention, an electronic device is provided with a voltage step-up type switching power supply device having any one of the first to eighth configurations described above as output conversion means for converting an output of a device power source. Here, as the device power source, battery may be used. With this configuration, it is possible to achieve miniaturization and improved reliability of the electronic device.

Advantages of the Invention

As discussed above, with a voltage step-up type switching power supply device of the present invention, it is possible to properly cut off the current path from the node to which the input voltage applied to the load, if necessary, and thereby to contribute to miniaturization and improved reliability of the electronic device incorporating the same.

LIST OF REFERENCE SYMBOLS

10 battery
20 DC/DC converter (switching regulator)
30 TFT liquid crystal panel 21 switching power supply IC
211 switch drive circuit
212 output feedback circuit
213 output-short (ground short) detecting circuit
CTRL switching control section
N1 to N3 N-channel field-effect transistors
P1 to P3 P-channel field-effect transistors
ERR error amplifier
E1 DC voltage supply
OSC oscillator
CMP1, CMP 2 comparators
I1 constant current supply
C1 capacitor
R1 to R3 resistors
SW switch device
INV inverter
OR OR circuit
T1 to T4 external terminals
Lex inductor (externally fitted)
Cex smoothing capacitor (externally fitted)
Rex resistor (externally fitted)

BEST MODE FOR CARRYING OUT THE INVENTION

The following description discusses examples of how the present invention is applied to a DC/DC converter incorporated in a mobile-phone unit for the purpose of converting the output voltage of a battery to generate a drive voltage for driving different parts (for example, a TFT (thin film transistor) liquid crystal panel) of the mobile-phone unit.

Figure 1:
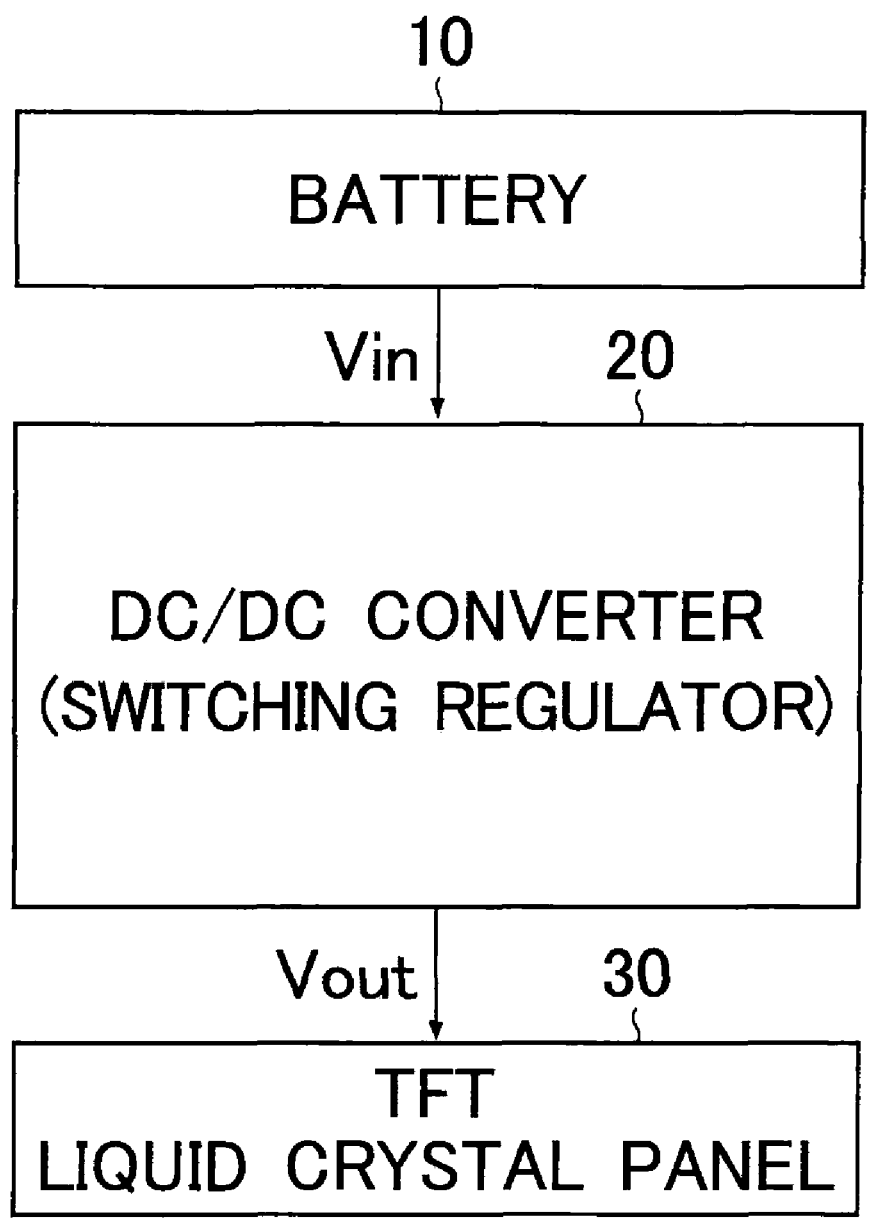
[FIG. 1] A block diagram showing a mobile-phone unit embodying the present invention.

FIG. 1 is a block diagram showing a mobile-phone unit embodying the present invention (in particular, the power supply system for the TFT liquid crystal panel). As shown in the figure, the mobile-phone unit of this embodiment is provided with a battery 10 which is a device power source, a DC/DC converter 20 which is output converting means of the battery 10, and a TFT liquid crystal panel 30 which is display means of the mobile-phone unit. Although not shown in the figure, it should be understood that the mobile-phone unit of this embodiment is provided with, in addition to the above mentioned components, a transmitter-receiver circuit portion, a speaker portion, a microphone portion, a display portion, an operation portion, a memory portion, and the like as means for realizing its essential functions (communication function, etc.).

The DC/DC converter 20 generates a constant output voltage Vout from an input voltage Vin applied by the battery 10, and then supplies the output voltage Vout to the TFT liquid crystal panel 30.

Figure 2:
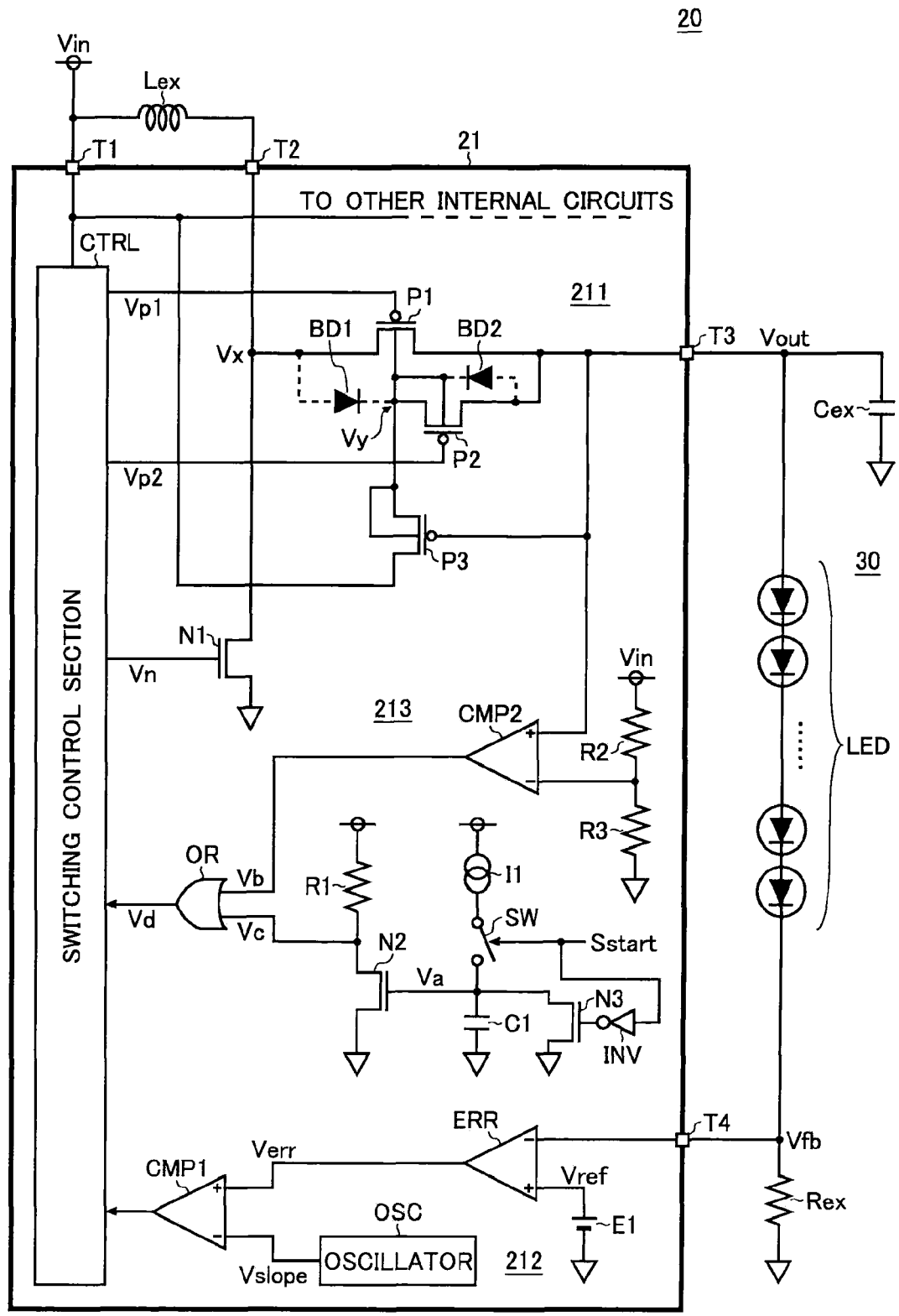
[FIG. 2] A circuit diagram showing an example of the configuration of a DC/DC converter 20.

FIG. 2 is a circuit diagram (partly presented as a block diagram) showing an example of the configuration of the DC/DC converter 20. As shown in this figure, the DC/DC converter 20 of this embodiment is a voltage step-up type switching regulator (chopper type regulator) having, in addition to a switching power supply IC 21, an externally fitted inductor Lex, a smoothing capacitor Cex, and a resistor Rex.

The switching power supply IC 21 is provided with, in terms of circuit blocks, a switch drive circuit 211, an output feedback circuit 212, and an output-short (ground short) detecting circuit 213, and is also provided with external terminals T1 to T4 as external electrical connection means. In the switching power supply IC 21, in addition to the above mentioned circuit blocks, a protection circuit block (a low-input malfunction prevention circuit, a heat protection circuit, or the like) may additionally be incorporated, if necessary.

The switch drive circuit 211 includes a switching control section CTRL, an N-channel field-effect transistor N1, and P-channel field-effect transistors P1 to P3.

The output feedback circuit 212 includes an error amplifier ERR, a DC voltage supply E1, an oscillator OSC, and a comparator CMP1.

An output-short (ground short) detecting circuit 213 includes a comparator CMP2, a constant current supply I1, a capacitor C1, a switch device SW, an inverter INV, N-channel field-effect transistors N2 and N3, resistors R1 to R3, and an OR circuit OR.

The power input node of the switching control section CTRL and the power input nodes of other internal circuits (not shown) are all connected to the external terminal T1 (power supply terminal).

The drain of the transistor N1 is connected to the external terminal T2 (input terminal). The source of the transistor N1 is grounded. The gate of the transistor N1 is connected to the gate-signal output node of the switching control section CTRL.

The drain of the transistor P1 is connected to the external terminal T2. The source of the transistor P1 is connected to the external terminal T3 (output terminal). The gate of the transistor P1 is connected to the gate-signal output node of the switching control section CTRL. The transistor P1 is accompanied by, between the drain and backgate thereof, a body diode BD1, with the anode and cathode thereof connected to the drain and backgate of the transistor P1, respectively.

The drain of the transistor P2 is connected to the external terminal T3. The source of the transistor P2 is connected to the backgate of the transistor P1. The gate of the transistor P2 is connected to the gate-signal output node of the switching control section CTRL. The backgate of the transistor P2 is connected to the source of the transistor P2 itself. The transistor P2 is accompanied by, between the drain and backgate thereof, a body diode BD2, with the anode and cathode thereof connected to the drain and backgate of the transistor P2, respectively.

The drain of the transistor P3 is connected to the external terminal T1. The source of the transistor P3 is connected to the backgate of the transistor P1. The gate of the transistor P3 is connected to the external terminal T3. The backgate of the transistor P3 is connected to the source of the transistor P3 itself.

The inverting input terminal (−) of the error amplifier ERR is connected to the external terminal T4 (output feedback terminal). The non-inverting input terminal (+) of the error amplifier ERR is connected to the positive end of the DC voltage supply E1. The negative end of the DC voltage supply E1 is grounded. The non-inverting input terminal (+) of the comparator CMP1 is connected to the output terminal of the error amplifier ERR. The inverting input terminal (−) of the comparator CMP1 is connected to the output end of the oscillator OSC. The output terminal of the comparator CMP1 is connected to the PWM signal input node of the switching control section CTRL.

The non-inverting input terminal (+) of the comparator CMP2 is connected to the external terminal T3. The inverting input terminal (−) of the comparator CMP2 is connected to the connection node between the resistors R2 and R3, which are connected in series between the power line and the ground end. The output terminal of the comparator CMP2 is connected to one input node of the OR circuit OR. One end of the switch device SW is connected to the power line via the constant current supply I1. The other end of the switch device SW is grounded via the capacitor C1 and is also connected to the gate of the transistor N2 and to the drain of the transistor N3. The control terminal of the switch device SW is connected to the startup signal Sstart application node. The drain of the transistor N2 is connected to the power line via the resistor R1 and is also connected to the other input node of the OR circuit OR. The sources of the transistors N2 and N3 are grounded. The gate of the transistor N3 is connected, via the inverter INV, to the startup signal Sstart application node. The output node of the OR circuit OR is connected to the detection signal input node of the switching control section CTRL.

Outside the switching power supply IC 21, the external terminal T1 is connected to the node to which input voltage Vin is applied from the battery 10, and is also connected to one end of the inductor Lex. The external terminal T2 is connected to the other end of the inductor Lex. The external terminal T3 is grounded via the smoothing capacitor Cex, and is also connected to the anode end of a light-emitting-diode line LED of the TFT liquid crystal panel 30 serving as a load. The external terminal T4 is grounded via the resistor Rex, and is also connected to the cathode end of the light-emitting-diode line LED.

Now, a description will be given of the basic operation (DC/DC conversion operation) of the switching power supply IC 21 configured as described above.

The transistor Ni is an output transistor of which the switching (turning-on and -off) is controlled according to the gate voltage Vn from the switching control section CTRL, and the transistor P1 is a synchronous rectifier transistor of which the switching (turning-on and -off) is controlled according to the gate voltage Vp1 from the switching control section CTRL.

The switching control section CTRL, when the input voltage Vin is stepped up to generate the output voltage Vout, controls the switching of the transistors N1 and P1 complementarily to each other with the transistor P2 constantly kept on.

It should be understood that the term "complementarily" used in this specification covers not only cases where the turning on/off of the transistor N1 and that of the transistor P1 take place exactly oppositely to each other but also cases where, from the perspective of preventing a through current, the turning on/off of the transistor N1 takes place with a predetermined delay relative to that of the transistor P1.

When the transistor N1 is turned on, a switch current flowing via the transistor N1 to the ground end flows through the inductor Lex, and the electric energy of the switch current is stored in the inductor Lex. In the on-period of the transistor N1, if the smoothing capacitor Cex has already been charged, a current from the smoothing capacitor Cex flows through the light emitting diode line LED serving as a load. In this state, the transistor P1, which is a synchronous rectifier device, is turned off complementarily to the on-state of the transistor N1, and hence no current is allowed to flow into the transistor N1 from the smoothing capacitor C1.

On the other hand, when the transistor N1 is turned off, a counter electromotive voltage appears in the inductor Lex to discharge the electric energy that has been stored therein. In this state, the transistor P1 is turned on complementarily to the off-state of the transistor N1, and thus the current passed from the external terminal T2 via the transistor P1 is allowed to flow from the external terminal T3 into the light emitting diode line LED serving as the load, and is also allowed to flow into the ground end via the smoothing capacitor Cex, thereby charging the smoothing capacitor Cex. Through the repetition of the above described operation, a DC output smoothed by the smoothing capacitor Cex is supplied to the light emitting diode line LED serving as the load.

Thus, the switching power supply IC 21 of this embodiment, by controlling the switching of the transistors N1 and P1, serves as a component of a chopper type voltage step-up circuit that steps up the input voltage Vin to generate the output voltage Vout.

Next, a description will be given of the output feedback control operation of the switching power supply IC 21 configured as described above.

In the switching power supply IC 21, the error amplifier ERR amplifies the difference between an output feedback voltage Vfb (corresponding to the actual value of the output voltage Vout) derived from one end of the resistor Rex and a reference voltage Vref (corresponding to the target value Vtarget of the output voltage Vout) generated by the DC voltage supply E1, thereby generating an error voltage signal Verr. Therefore, the further the output voltage Vout is lower than its target value Vtarget, the higher the voltage level of the error voltage signal Verr is. The oscillator OSC generates a predetermined triangular-wave voltage signal Vslope.

The comparator CMP1 is a PWM comparator that compares the error voltage signal Verr and the triangular-wave voltage signal Vslope and generates a PWM (pulse width modulation) signal. More specifically, the on-duty of the PWM signal (the rate of the on-period of the transistor N1 per unit period) continuously varies according to which of the error voltage signal Verr and the rectangular-wave voltage signal Vslope is higher. More specifically, the further the output voltage Vout is lower than the target voltage thereof Vtarget, the larger the on-duty of the PWM signal is; and the closer the output voltage Vout is to the target voltage thereof Vtarget, the smaller the on-duty of the PWM signal is.

The switching control section CTRL, when the input voltage Vin is stepped up to generate the output voltage Vout, controls the switching of the transistors N1 and P1 complementarily to each other in response to the PWM signal. More specifically, the switching control section CTRL keeps the transistor N1 on and the transistor P1 off during the on-period of the PWM signal; the switching control section CTRL keeps the transistor N1 off and the transistor P1 on during the off-period of the PWM signal.

Thus, the switching power supply IC 21 of this embodiment is capable of keeping the output voltage Vout equal to its target value Vtarget by an output feedback control operation based on the error voltage signal Verr.

Figure 3:
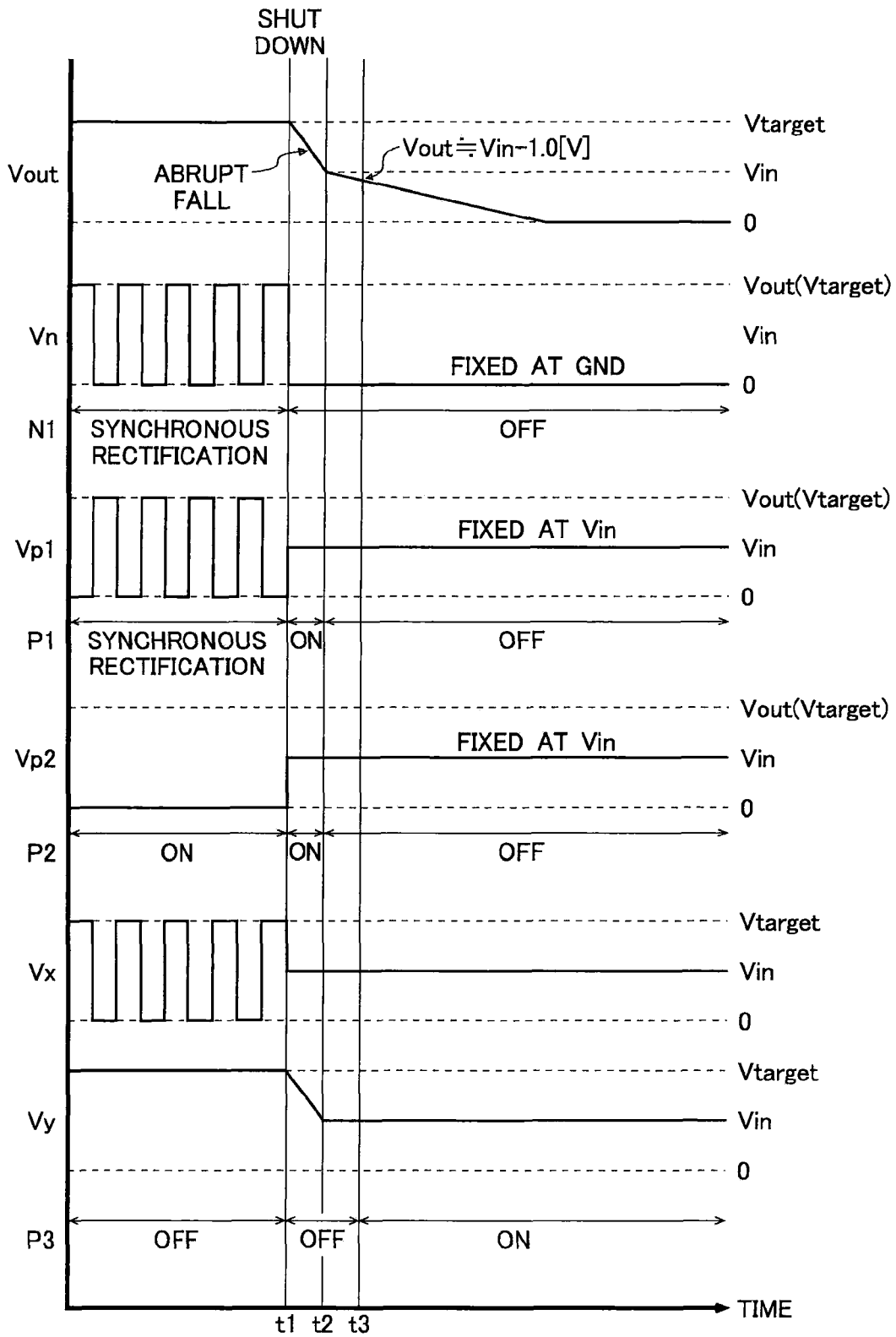
[FIG. 3] A diagram illustrating an example of the shut-down operation of a switching power IC 21.

Next, a detailed description will be given of how the operation of the switching power supply IC 21 configured as described above is stopped (the shut-down operation thereof) with reference to FIGS. 2 and 3. FIG. 3 is a diagram illustrating an example of the shut-down operation of the switching power supply IC 21, and particularly shows the device behavior observed when an input voltage Vin is applied to the gates of the transistors P1 and P2 to stop the operation of the device.

When a shut-down instruction is given to the switching power supply IC 21 at time t1, a ground voltage is applied to the transistor N1 as the gate voltage Vn, and the transistor N1 is turned off. Thus, the switching power supply IC 21 stops its voltage step-up operation.

On the other hand, the input voltage Vin is applied to each of the transistors P1 and P2 as gate voltages Vp1 and Vp2, respectively. Here, the output voltage Vout is still kept higher than the input voltage Vin, and thus, in each of the transistors P1 and P2, the gate potential (Vin) is lower than the source potential (Vout). Thus, the transistors P1 and P2 are continuously kept on, regardless of the change in the gate voltages described above. As a result, an electric charge stored in the smoothing capacitor Cex is discharged quickly via the transistor P1 to the node to which the input voltage Vin is applied, and thus the output voltage Vout falls abruptly (from time t1 to time t2).

Thus, applying the input voltage Vin to each of the gates of the transistors P1 and P2 allows the output voltage Vout to fall abruptly when the switching power supply IC 21 is turned off. In addition, with this configuration, it is possible to prevent the voltage Vx appearing at the external terminal T2 from abruptly rising at the same time that the switching power supply IC 21 is turned off as described above and thereby to eliminate the need to provide the switching power supply IC 21 with an unnecessarily large withstand voltage margin.

Figure 6A:
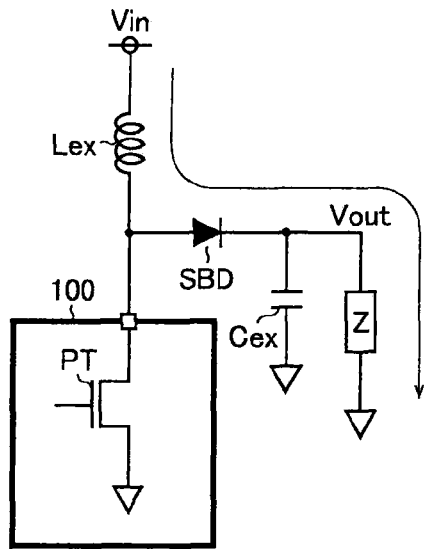
[FIG. 6A]
Figure 6B:
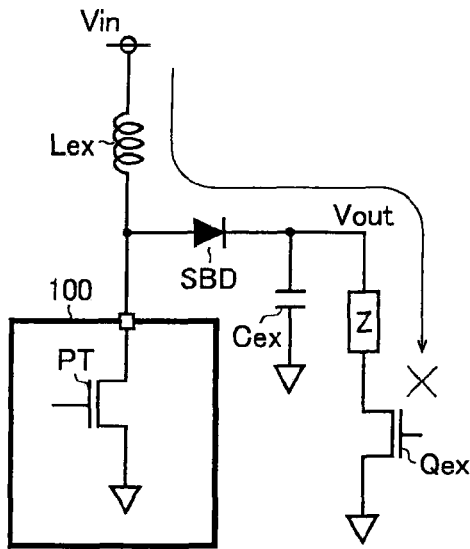
[FIG. 6B]
Figure 6C:
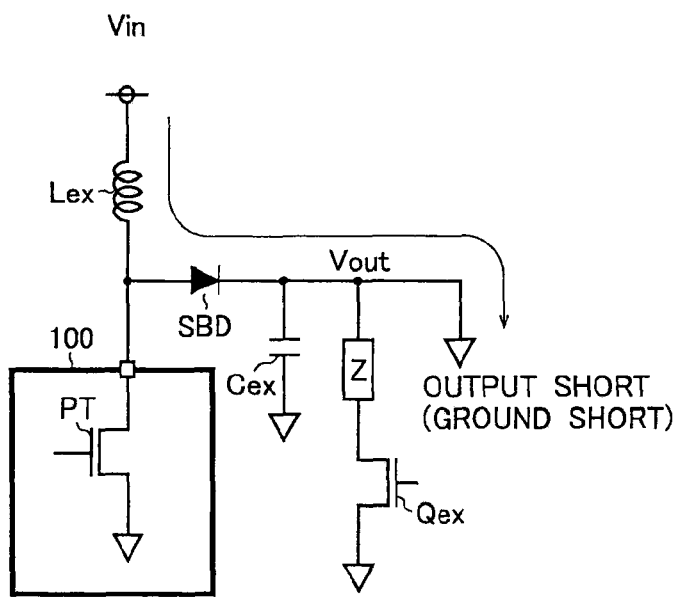
[FIG. 6C] Circuit diagrams showing an example of a conventional DC/DC converter.

Then, when the output voltage Vout drops to the input voltage Vin at time t2, the transistors P1 and P2 are turned off. This makes it possible to cut off the current path from the external terminal T2 to the light emitting diode line LED, and hence, from this time on, regardless of a change in the input voltage Vin or other events, it is possible to properly prevent a leak current from flowing into the light emitting diode line LED. In addition, with this configuration, no externally fitted transistor is needed to be provided for the purpose of cutting off a leak current (see FIG. 6B), and thus neither miniaturization nor weight/thickness reduction of the mobile-phone unit as a whole is prevented. After time t2, the output voltage Vout is lowered to 0 [V] in about 10 [ms] by an internal pull-down circuit which is not illustrated.

The above described transistor P2 is provided as means for cutting off the current path via the body diode BD1 that accompanies the transistor P1. In a configuration where, in order to improve the switching characteristic of the transistor P1, simply the backgate and the source of the transistor P1 are connected to each other, there exists a current path from the inductor Lex via the body diode BD1 to the light emitting diode line LED. In contrast, with the configuration where the transistor P2 is arranged on the current path from the inductor Lex via the body diode BD1 to the light emitting diode line LED and both of the transistors P1 and P2 are turned off when the operation of the switching power supply IC 21 is stopped, it is possible to cut off the current path described above and thereby to prevent a leak current from flowing from the inductor Lex to the light emitting diode line LED.

As for the transistor P3, the gate potential thereof (output voltage Vout) falls abruptly from time t1 to time t2 as described above, and also after the transistors P1 and P2 are turned off at time t2, the gate voltage continues to decrease gradually. In contrast, the source voltage Vy of the transistor P3, though it falls abruptly along with the output voltage Vout from time t1 to time t2, is kept at the same level as the voltage Vx (input voltage Vin) after time t2, because it is pulled up by the external terminal T2 via the body diode BD1. Thus, the transistor P3 is kept off until the output voltage Vout falls to approximately Vin-$V_{GS}$1.0 [V], and when the output voltage Vout falls to the above mentioned potential level at time t3, the transistor P3 spontaneously turns on without any requiring any control. Thus, it can be said that the transistor P3 serves as means for fixing, when the output voltage Vout falls to the above mentioned potential level, the backgate potentials of the transistors P1 and P2 at the input voltage Vin which is the highest potential at the time. With this configuration, it is possible to bias the backgates of the transistors P1 and P2 at a high potential and thereby to ensure that the transistors P1 and P2 remain in the off state.

What is important here is that, during the period from time t1 to time t2, when the transistors P1 and P2 are on (that is, when the charge stored in the smoothing capacitor Cex is quickly discharged), the transistor P3 is kept off and the backgates of the transistors P1 and P2 are each kept in a float state. Through achievement of such operation, it is possible to prevent a large current from flowing via the transistor P3 into the internal circuits to which power is fed via the external terminal T1 and thereby to protect their components from breakdown.

Figure 4:
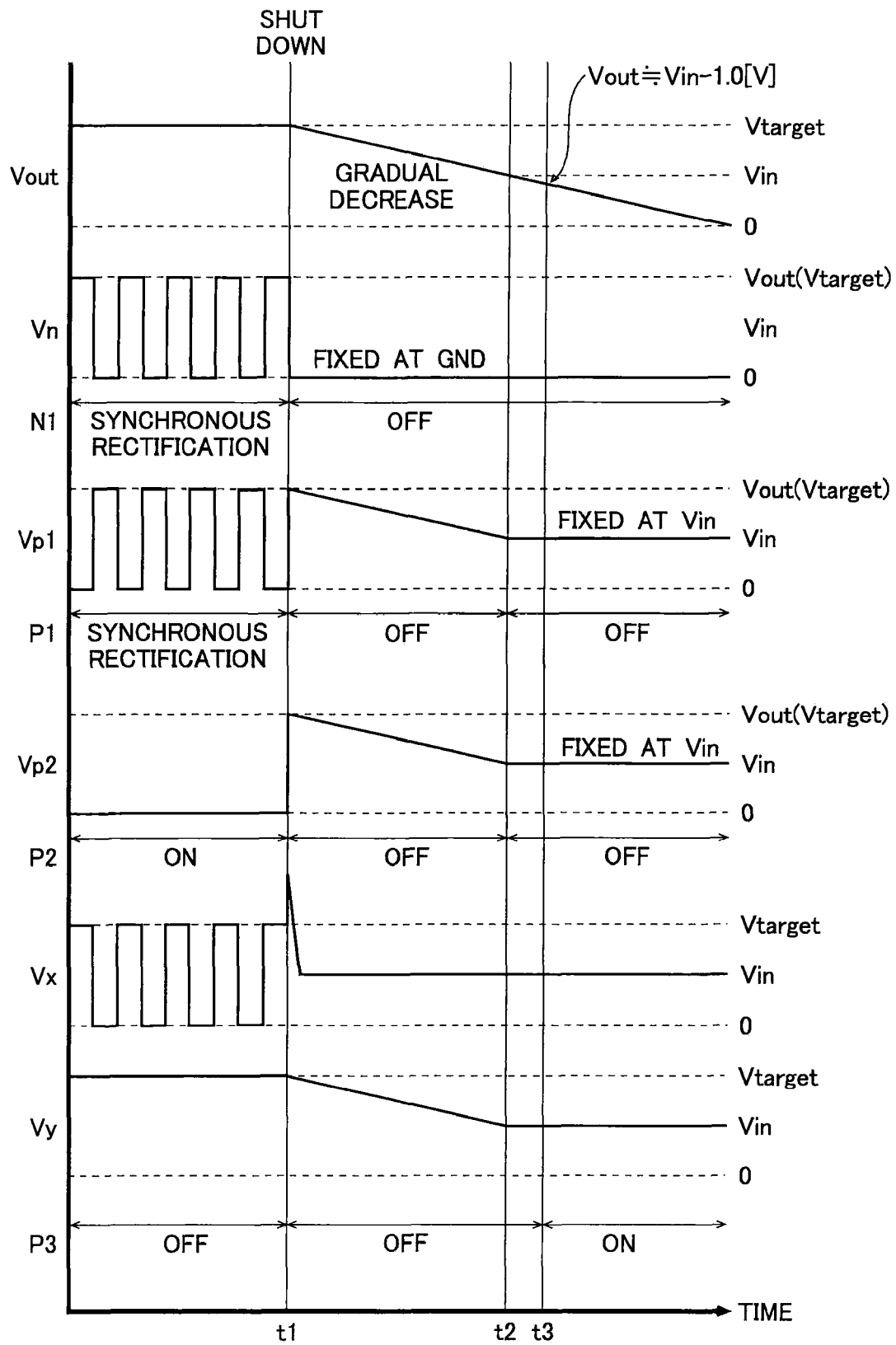
[FIG. 4] A diagram illustrating another example of the shut-down operation of the switching power IC 21.

The embodiment described above deals with a configuration where, when device operation is stopped, the input voltage Vin is applied to the gates of the transistors P1 and P2, but it should be understood that the present invention may be practiced in any manner other than specifically described above, and a configuration may be adopted where, as shown in FIG. 4, the output voltage Vout is applied to the gates of the transistors P1 and P2 when the operation of the device is stopped.

With this configuration, when a shut-down instruction is given to the switching power supply IC 21 at time t1, the transistors P1 and P2 are turned off. As a result, in this configuration, as compared with in the configuration of the above described embodiment, there exist a smaller number of current paths through which the charge stored in the smoothing capacitor Cex is discharged, and this allows the output voltage Vout to decrease gradually. Thus, in cases where it is necessary to turn on/off the switching power supply IC 21 many times, adopting this configuration makes it possible to reduce power loss in and improve efficiency of the switching power supply IC 21.

However, in this configuration, where the transistors P1 and P2 are turned off at the same time that the switching power supply IC 21 is shut down, electric energy stored in the inductor Lex may cause the voltage Vx appearing at the external terminal T2 to abruptly rise at the same time that the switching power supply IC 21 is shut down as described above. Hence, when this configuration is adopted, it is necessary to provide the switching power supply IC 21 with an adequately large withstand voltage margin.

Finally, with reference to FIG. 5, a detailed description will be given of the output-short protection operation of the switching power IC 21 configured as described above.

When the switching power supply IC 21 starts its operation in response to an enable signal fed from outside at time t4, the output voltage Vout starts to increase gradually at a predetermined rate. The waveforms in FIG. 5 result from a voltage of 3.6 [V] being applied as the input voltage Vin from before time t4.

The comparator CMP2 compares the output voltage Vout with a predetermined threshold voltage (a division voltage generated by dividing the input voltage Vin and derived from the connection node between the resistors R2 and R3) and outputs as its comparison output a voltage signal Vb whose logic level (high level/low level) varies according to which of the output voltage Vout and the threshold voltage is higher. More specifically, when the output voltage Vout is higher than the threshold voltage, the logic level of the voltage signal Vb is high, and when the output voltage Vout is not higher than the threshold voltage, the logic level of the voltage signal Vb is low. Thus, by monitoring the logic level of the voltage signal Vb, it is possible to detect whether or not an output short (ground short) is occurring.

However, immediately after the start of the operation of the switching power supply IC 21 is the output-undetectable period of the comparator CMP2 itself, during which the logic level of the voltage signal Vb is kept low although the output voltage Vout rises. Thus, if the just mentioned voltage signal Vb itself is used as the output-short detection signal (a signal for indicating to the switching control section CTRL whether or not an output short is occurring), an output short is erroneously detected during the output-undetectable period.

To cope with this inconvenience, in the switching power supply IC 21 of this embodiment, the following signal processing (output-detection masking operation) is performed to avoid the above described erroneous detection of an output short.

Figure 5:
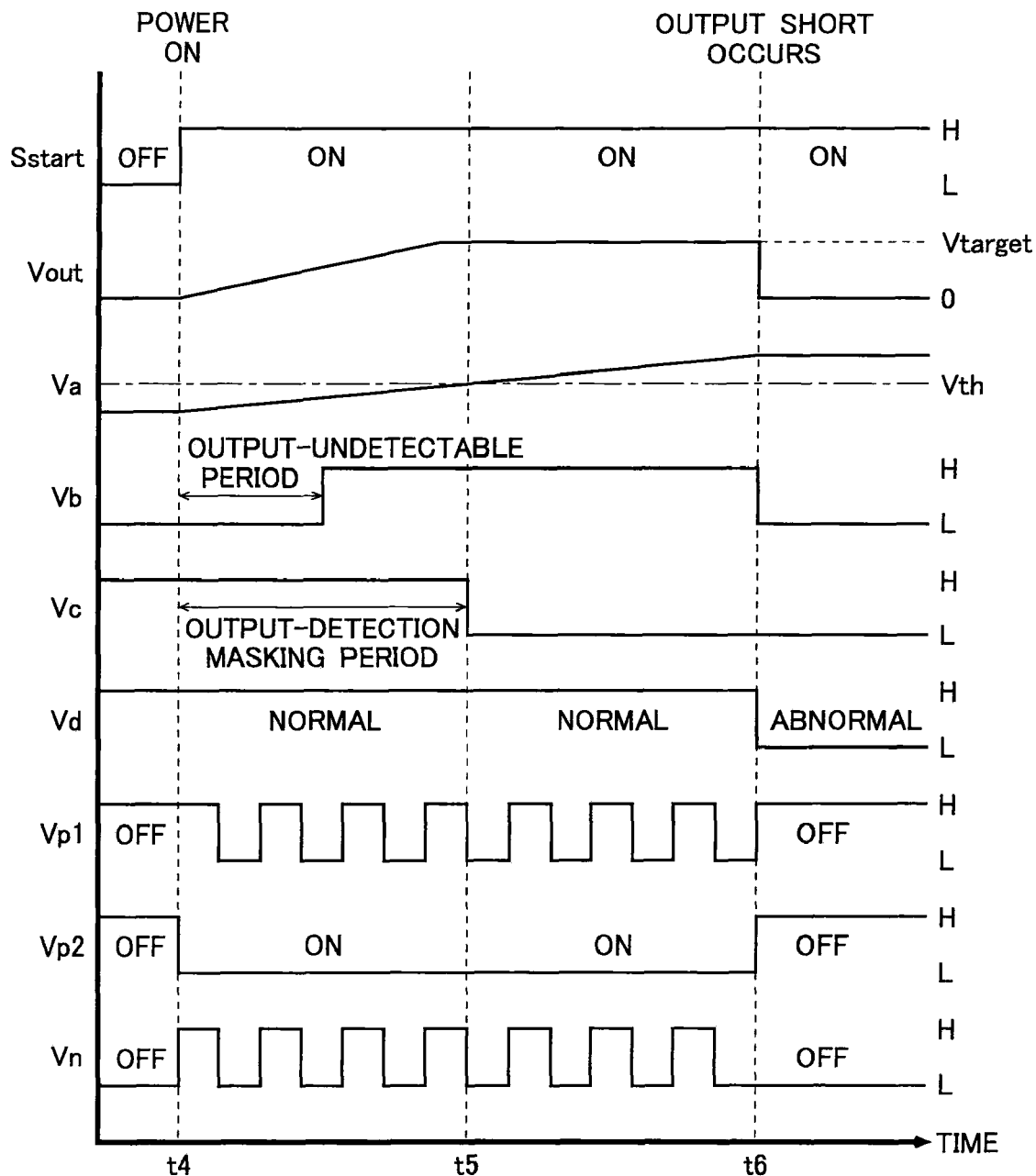
[FIG. 5] A diagram illustrating an example of the output-short protection operation of the switching power IC 21.

In the switching power supply IC 21 of this embodiment, simultaneously with the start of the operation of the switching power supply IC 21 described above, a startup signal Sstart for controlling the switching of the switch device SW is inputted (in FIG. 5, illustrated as a shift to high level), whereby the switch device SW is turned on and the transistor N3 is turned off. Incidentally, the transistor N3 is discharge means of the capacitor C1 which is turned on when the startup signal Sstart is not inputted.

The switching described above starts the charging of the capacitor C1, and the voltage signal Va applied to the gate terminal of the transistor N2 starts to increase gradually. Thereafter, until a voltage signal Va reaches a predetermined threshold voltage Vth, the transistor N2 is kept off and a voltage signal Vc (output-detection masking signal) derived from the drain of the transistor N2 is kept high.

The length of time the voltage signal Va takes to reach the threshold voltage Vth (from time t4 to time t5) corresponds to the output-detection masking period and is set longer than the output-undetectable period of the comparator CMP2. The length of the output detection masking period can be adjusted easily by appropriately setting the value of the constant current generated at the constant current supply I1 or the value of the capacity of the capacitor C1.

The OR circuit OR feeds the switching control section CTRL with, as an output-short detection signal Vd, a voltage signal generated by performing an OR operation between the voltage signals Vb and Vc. Thus, the logic level of the output-short detection signal Vd is high when at least one of the voltage signals Vb and Vc is high, and the logic level of the output-short detection signal Vd is low only when both of the voltage signals Vb and Vc are low.

Here, during the period until the voltage signal Va reaches the threshold voltage Vth (from time t4 to time t5), the level of the voltage signal Vc is high as described above. Therefore, during the period, even if the level of the voltage signal Vb is kept low due to the output detection incapability of the comparator CMP2, the logic of the voltage signal Vb is masked by the voltage signal Vc which is high, and thus the logic level of the output-short detection signal Vd is high. Thus, the switching control section CTRL, receiving the output-short detection signal Vd, recognizes that no output short is occurring and performs its normal operation, and thus failure to start up can be prevented.

Then, charging of the capacitor C1 proceeds, and when the voltage signal Va reaches the threshold voltage Vth at time t5, the transistor N2 is turned on, and the level of the voltage signal Vc derived from the drain of the transistor N2 is turned to be low (approximately ground potential). In this state, at time t5, the capacitor CMP2 is capable of detecting an output, and the level of the voltage signal Vb is high in response to the rise of the output voltage Vout. Thus, the logic level of the output-short detection signal Vd generated at the OR circuit OR is high reflecting the logic state of the voltage signal Vb, and the switching control section CTRL, having received the output-short detection signal Vd having the just mentioned logic, recognizes that no output short is occurring and thus can perform its normal operation.

If an output short (ground short) occurs at time t6, the output voltage Vout falls to the ground potential, and hence the level of the voltage signal Vb is turned to be low. In this state, the switch device SW is kept on by being fed with the start signal Sstart; the voltage signal Va continues to be kept higher than the threshold voltage Vth; and the transistor N2 is kept on. Thus, the voltage signal Vc continues to be kept low. As a result, both of the voltage signals Vb and Vc are low, and thus the logic level of the output-short detection signal Vd generated at the OR circuit OR is turned to be low. Therefore, the switching control section CTRL, receiving the output-short detection signal Vd having the just mentioned logic, recognizes that an output short is occurring and turns the transistors N1, P1, and P2 off, and thus can stop the operation of the device. The shut-down control described above makes it possible to prevent a short-circuit current from flowing from the inductor Lex to the switching power supply IC 21 and thereby to protect devices inside the IC and components externally fitted to the IC from breakdown.

In the embodiment described above, a configuration is dealt with where the charging operation of the capacitor C1 is used to generate an output-detection masking signal, but the configuration of the present invention is not limited to this configuration, and for example, a timer circuit or the like may be used to achieve the output-detection masking operation described above.

In the embodiment described above, it is assumed that the present invention is applied to the DC/DC converter 20 which is mounted in a mobile-phone unit and is used as means for converting the output of the battery 10. This, however, is not meant to limit the application of the present invention to such an embodiment; in practice, the present invention finds a wide application in voltage step-up type switching power supply devices in general.

The present invention may be practiced with various modifications and variations made otherwise than specifically described above within the spirit of the invention.

INDUSTRIAL APPLICABILITY

The present invention offers an art that is useful in achieving miniaturization and improved reliability of an electronic device incorporating a voltage step-up type switching power supply device and that is suitably applicable to electronic devices in general incorporating a switching power supply device such as battery-operated electronic devices.

What is claimed is:

1. An output device integrated into an integrated circuit, the output device comprising:
   an input terminal to receive an input voltage applied via an inductor;
   an output terminal to feed an output voltage to a load;
   an output transistor connected between the input terminal and a predetermined standard voltage node;
   a first transistor connected between the input terminal and the output terminal;
   a second transistor connected between the output terminal and a backgate of the first transistor; and
   switching control circuitry to control switching of the output transistor, the first transistor, and the second transistor,
   wherein, the output device is operable so that when the input voltage is stepped up to generate the output voltage, the switching control circuitry controls switching of the output transistor and the first transistor complementarily to each other, while keeping the second transistor on, and wherein when operation of the device is stopped, the switching control circuitry turns off the output transistor, the first transistor, and the second transistor.

2. The output device of claim 1 further comprising:
a power supply terminal to receive the input voltage directly; and
a third transistor whose source is connected to the backgate of the first transistor and whose drain is connected to the power supply terminal, a gate of the third transistor being connected to the output terminal.

3. The output device of claim 1 wherein when operation of the device is stopped, the switching control circuitry is operable to apply the input voltage to gates of the first and second transistors.

4. The output device of claim 2 wherein when operation of the device is stopped, the switching control circuitry is operable to apply the input voltage to gates of the first and second transistors.

5. The output device of claim 1 wherein when operation of the device is stopped, the switching control circuitry is operable to apply the output voltage to gates of the first and second transistors.

6. The output device of claim 1 further comprising:
an error amplifier to generate an error voltage signal by amplifying a difference between a predetermined target voltage and a feedback voltage that varies with the output voltage;
an oscillator to generate a predetermined triangular-wave voltage signal; and
a PWM comparator to compare the error voltage signal with the triangular-wave voltage signal and to generate a PWM signal,
wherein, the output device is operable so that when the input voltage is stepped-up to generate the output voltage, the switching control circuitry, based on the PWM signal, controls the switching of the output transistor and the first transistor complementarily to each other.

7. The output device of claim 1 further comprising:
an output-short detecting circuit to monitor the output voltage and to generate an output-short detection signal for indicating to the switching control circuitry whether or not an output short circuit is occurring,
wherein the switching control circuitry is operable to turn off the output transistor, the first transistor, and the second transistor when, based on the output-short detection signal, the switching control circuitry recognizes that an output-short is occurring.

8. The output device of claim 7 wherein the output-short detecting circuit includes:
a comparator to invert an output logic thereof when the output voltage falls below a predetermined threshold voltage; and
output detection masking means that, during a predetermined output detection masking period starting at startup of the device, produces a constant output regardless of the output logic of the comparator, and after the predetermined output detection masking period ends, reflects the output logic of the comparator by inverting the output logic of the output-short detection signal, and
wherein the switching control circuitry, upon recognizing that an output short is occurring based on the output-short detection signal, turns off the output transistor, the first transistor, and the second transistor.

9. An electronic device comprising:
an output device operable to convert an output of a device power source,
wherein the output device is integrated into an integrated circuit and comprises:
an input terminal to receive an input voltage applied via an inductor;
an output terminal to feed an output voltage to a load;
an output transistor connected between the input terminal and a predetermined standard voltage node;
a first transistor connected between the input terminal and the output terminal;
a second transistor connected between the output terminal and a backgate of the first transistor; and
switching control circuitry to control switching of the output transistor, the first transistor, and the second transistor,
wherein, the output device is operable so that when the input voltage is stepped up to generate the output voltage, the switching control circuitry controls switching of the output transistor and the first transistor complementarily to each other, while keeping the second transistor on, and wherein when operation of the device is stopped, the switching control circuitry turns off the output transistor, the first transistor, and the second transistor.

10. The electronic device of claim 9 wherein the device power source is comprises a battery.

* * * * *